US009352859B2

(12) United States Patent
Librio

(10) Patent No.: US 9,352,859 B2
(45) Date of Patent: May 31, 2016

(54) DEVICE AND METHOD FOR FEEDING CHARGES OF NON-HOMOGENEOUS INFUSION MATERIAL TO A PACKAGING MACHINE

(75) Inventor: Lucio Librio, Bologna (IT)

(73) Assignee: TECNOMECCANICA S.R.L., Bologna (IT)

( * ) Notice: Subject to any disclaimer, the term of this patent is extended or adjusted under 35 U.S.C. 154(b) by 91 days.

(21) Appl. No.: 13/818,284

(22) PCT Filed: Sep. 9, 2011

(86) PCT No.: PCT/IB2011/053943
§ 371 (c)(1),
(2), (4) Date: Feb. 21, 2013

(87) PCT Pub. No.: WO2012/035473
PCT Pub. Date: Mar. 22, 2012

(65) Prior Publication Data
US 2013/0168416 A1    Jul. 4, 2013

(30) Foreign Application Priority Data
Sep. 16, 2010   (IT) .............................. BO2010A0561

(51) Int. Cl.
*B65B 1/10* (2006.01)
*B65B 1/36* (2006.01)
*B65B 29/02* (2006.01)
*G01F 11/24* (2006.01)

(52) U.S. Cl.
CPC . *B65B 1/10* (2013.01); *B65B 1/366* (2013.01); *B65B 29/02* (2013.01); *G01F 11/24* (2013.01)

(58) Field of Classification Search
CPC .................................. B65B 1/10; B65B 1/366

USPC ................................. 222/218, 219, 367, 368
See application file for complete search history.

(56) References Cited

U.S. PATENT DOCUMENTS

| | | | | |
|---|---|---|---|---|
| 1,545,513 | A * | 7/1925 | Peters et al. | ................... 425/139 |
| 4,437,294 | A * | 3/1984 | Romagnoli | ............. B65B 1/366 |
| | | | | 222/332 |
| 4,531,597 | A | 7/1985 | Focke | |
| 4,583,571 | A * | 4/1986 | Focke | .................... B65G 47/58 |
| | | | | 131/282 |
| 4,617,974 | A * | 10/1986 | Focke et al. | ................... 141/239 |
| 5,174,088 | A * | 12/1992 | Focke | ...................... B65B 1/38 |
| | | | | 53/111 R |
| 6,135,120 | A * | 10/2000 | Lofman et al. | ................ 131/112 |
| 6,321,506 | B1 | 11/2001 | Rolland | |

(Continued)

FOREIGN PATENT DOCUMENTS

| | | |
|---|---|---|
| CH | 524362 | 6/1972 |
| GB | 2074133 | 10/1981 |

*Primary Examiner* — Daniel R Shearer
(74) *Attorney, Agent, or Firm* — Themis Law

(57) ABSTRACT

A device for feeding charges of non-homogeneous infusion material to a packaging machine includes a metering device for the charges and transfer system for the charges which is positioned downstream of the metering device and which feeds the charges to the packaging machine. The transfer system includes a charge adjustment system equipped with a drum which is rotatable about its own axis A and at least one roller which is rotatable about its own axis B and which is located upstream of the drum. The drum includes a chamber for receiving the charge from the roller. During adjustment of the charge, the chamber is variable between a maximum value coinciding with the receiving step and a minimum value when the charge has been adjusted.

11 Claims, 1 Drawing Sheet

(56) References Cited

U.S. PATENT DOCUMENTS

| | | | |
|---|---|---|---|
| 7,392,636 B2 * | 7/2008 | Conti | B65B 29/02 53/433 |
| 7,661,248 B2 * | 2/2010 | Conti | B65B 1/366 222/218 |
| 7,952,037 B2 * | 5/2011 | Jacobi et al. | B65B 1/32 131/108 |

* cited by examiner

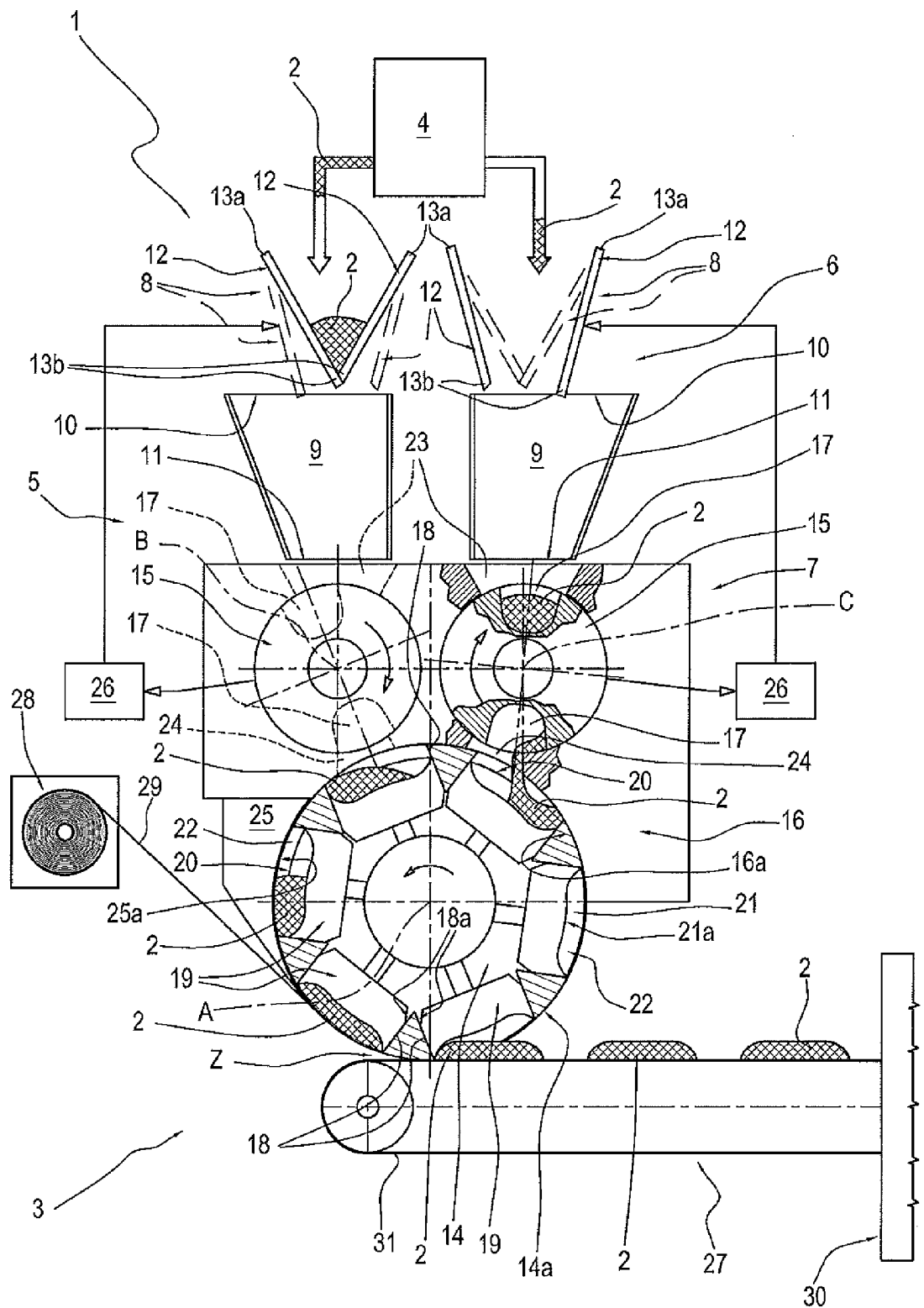

DEVICE AND METHOD FOR FEEDING CHARGES OF NON-HOMOGENEOUS INFUSION MATERIAL TO A PACKAGING MACHINE

TECHNICAL FIELD

This invention relates to a device and a method for feeding charges of non-homogeneous infusion material to a packaging machine.

BACKGROUND ART

More specifically, this invention applies generally to the technical field encompassing equipment used to feed infusion products to a packaging machine which fills into respective filter bags predetermined charges of non-homogeneous material consisting, for example, of flowers whole leaves, herbs or fruits and mixtures thereof, without limiting the scope of the invention.

This material is extremely fragile and is composed of elements whose physical properties, such as shape, specific weight, and size, differ widely from each other.

There are various ways of preparing the charges after the material has been mixed according to specific recipes. The charges may be made, for example, using weighing systems which guarantee that each charge has a predetermined weight or with volumetric systems which define, for each charge, a predetermined quantity of material, as described in patent EP584213 to Bonomelli s.r.l.

Patent EP584213 describes a volumetric batcher of the drawer type (plate) designed to batch whole chamomile flowers. The batcher is located downstream of a container into which the whole chamomile flowers are conveyed by a conveyor belt until the container is full to a predetermined level. More specifically, at the bottom of the container, there is a screw feeder mounted in a substantially horizontal manner and fully immersed in the chamomile flowers. The screw feeder is driven by an independent motor and conveys the chamomile flowers through a horizontal conduit towards a vertical conduit which communicates with the selfsame horizontal conduit.

The vertical conduit feeds a batching chamber of the drawer type batcher by means of a pad which operates longitudinally inside the vertical conduit.

The drawer type batcher is made up of three plates mounted one above the other: an upper plate and a lower plate, which are both fixed, and a movable plate located between the two fixed plates. In particular, the batching chamber is formed in the movable plate. Thus, the upper plate acts as a levelling device to form the right charge of material in the batching chamber and, together with the lower plate, acts as a charge containment plate which prevents material from falling out. The batching chamber is thus filled with chamomile flowers through the upper plate by means of a first hole which is coaxial with the vertical conduit and in which the pad operates. When the batching chamber is completely full, the movable plate moves axially and places the chamber in communication with second holes, which are coaxial with each other and which are formed in both the upper and lower, fixed plates. Next, a piston which slides through the second holes expels the charge of material from the batching chamber and directs it to a packaging machine which in the meantime has prepared the bags of filter material adapted to receive the charges.

In this solution, the chamomile flowers are compressed to a varying extent both inside the horizontal conduit, by the action of the screw feeder which conveys the flowers towards the vertical conduit, and inside the vertical conduit itself, by the action of the pad.

Another prior art solution for making charges of loose material and feeding them onto a web of filter material used for making filter bags comprises a cylindrical metering device with a horizontal axis of rotation and a plurality of radial cavities giving onto the outer cylindrical surface. The drum is interposed between a feed hopper for the loose material to be metered and the web of filter material onto which the metered charges to be packaged are placed.

In particular, the hopper for the loose material has an outlet opening which faces the metering drum and which is delimited, on one side, by a containment wall and, on the other side, by a levelling device.

In this solution, there are pistons sliding in the radial cavities which define the metering chambers in the drum. The pistons are driven by the continuous rotation of the drum and are made to move radially, through the agency of cam means, between a maximum distance from the periphery of the metering drum, defining the bottom dead centre, and a minimum distance from the periphery of the metering drum, defining the top dead centre. At the bottom dead centre, the piston is inserted gradually under the feed hopper on the containment wall side, allowing the loose material into the metering chamber. The continuous rotation of the drum causes the piston to move to the top dead centre while facing the outlet opening of the hopper and where, under the action of the levelling device, the charge of loose material is formed. As long as the piston remains at the top dead centre, the charge formed is held within the metering chamber by a stop member located downstream of the levelling device. As the stop member moves away, the charge formed is discharged from the metering chamber and placed on a horizontal stretch of the web of filter material substantially tangent to the metering drum. At the same time, the piston starts moving back to the bottom dead centre, which it reaches before being inserted into the zone where the loose material is drawn from under the hopper.

The devices described above, also called volumetric metering devices, have several disadvantages, connected with the levelling operation, during which the loose material being metered is subjected to a cutting-like action which damages it and deteriorates its quality. Moreover, these devices exert a compressive action on the material, which is not a problem if the material is homogeneous in nature. In the case of non-homogeneous material, however, where the individual elements must remain whole, compression damages parts of the material and deteriorates its quality.

The wholeness of the infusion material is an essential factor in guaranteeing the quality of the product for the consumer and it is therefore necessary to preserve the wholeness as far as possible.

DISCLOSURE OF THE INVENTION

This invention has for an aim to provide a device and a method for feeding charges of non-homogeneous infusion material to a packaging machine overcoming the above mentioned disadvantages of the prior art.

More specifically, the aim of this invention is to provide a device for feeding charges of non-homogeneous infusion material which is capable of receiving charges of predetermined, uniform weight and composition and to feed them continuously to a packaging machine without affecting the wholeness of the individual elements making up each charge.

The aim of this invention and the overcoming of the disadvantages of the prior art are substantially achieved by a device for feeding charges of non-homogeneous infusion material to a packaging machine as described hereinafter.

The aim of this invention and the overcoming of the disadvantages of the prior art are also substantially achieved by a method for feeding charges of non-homogeneous infusion material to a packaging machine as described hereinafter.

BRIEF DESCRIPTION OF THE DRAWING

Further features and advantages of this invention are more apparent in the detailed description below, with reference to a preferred, non-limiting embodiment of a device for feeding charges of non-homogeneous infusion material to a packaging machine, as illustrated in the accompanying drawing which shows a schematic front view, with some parts in cross section, of one embodiment of the device.

DETAILED DESCRIPTION OF THE PREFERRED EMBODIMENTS OF THE INVENTION

With reference to the accompanying drawing, the numeral 1 denotes a device for feeding charges 2 (or doses) of non-homogeneous infusion material to a packaging machine 3.

The material referred to comprises elements such as flowers, whole leaves, herbs or fruits and mixtures thereof.

The device 1 comprises metering means 4 (or dispensers) for the charges 2 which define, for each charge 2, a predetermined quantity of material. The metering means 4 basically comprise devices of known type, for example, of the type based on weight.

Downstream of the metering means 4 for the charges 2 there are transfer means 5 designed to feed the charges 2 to the packaging machine 3.

The transfer means 5 comprise an infeed station 6 and adjustment means 7 for the charges 2, located downstream of the infeed station 6 relative to the feed direction of the charge 2.

The adjustment means 7 (or adjustments, i.e. the means for bringing into proper, exact, or conforming position or condition) are thus defined because, as explained in more detail below, they are designed to arrange, adjust and adapt precisely the elements making up the charges 2 within a space whose volume is variable between a maximum and a minimum value, while avoiding strong compression which would damage the selfsame elements making up the charges 2.

The infeed station 6 comprises means 8 for retaining and releasing the charge 2 and at least one conduit 9 located at the outlet end of the retaining and releasing means 8 and having an inlet section 10 and an outlet section 11. In this embodiment, the inlet section 10 and the outlet section 11 of the conduit 9 differ in size and, more specifically, the inlet section 10 is larger.

The retaining and releasing means 8 comprise at least one swinging wall 12. More specifically, as shown in the drawing, the retaining and releasing means 8 have two swinging walls 12.

Each swinging wall 12 has two ends, namely, an upper end 13a and a lower end 13b.

The swinging walls 12 are pivoted at the top ends 13a and are designed to be set—by means of customary actuators which are not illustrated—at a first, retaining position where the lower ends 13b of a pair of walls are in contact with each other so as to retain the charge 2, and a second, releasing position where the lower ends 13b are spaced apart so as to release the charge 2.

The adjustment means 7 for the charges 2 comprise a drum 14, which is rotatable about its own horizontal axis A, and at least one roller 15, which is positioned upstream of the drum 14 and which is rotatable about its own horizontal axis B. More specifically, as shown in the drawing, there are two rollers 15, one rotatable about its own axis B and one rotatable about a further axis C, both parallel to the axis A. The rollers 15 are housed inside a box-shaped body 16.

The drum 14 has at least one chamber 22 for receiving the charges 2 from the rollers 15.

Each roller 15 has at least one recess 17 for receiving the charges 2 from the infeed station 6. More specifically, the rollers 15 shown in the drawing are furnished with two recesses 17.

The box-shaped body 16 comprises at least a first funnel-shaped mouth 23 which places the outlet section 11 of the conduit 9 in communication with the recess 17 of the roller 15 and at least a second funnel-shaped mouth 24 which places the recess 17 in communication with the chamber 22.

The adjustment means 7 comprise a fixed bent tile 25 positioned, downstream of the second funnel-shaped mouth 24 relative to the direction of rotation of the drum 14.

The drum 14 is mounted under the rollers 15 and has an outer cylindrical surface 14a facing a lower surface 16a, formed on the box-shaped body 16, and a curved surface 25a of the fixed bent tile 25 contiguous with the selfsame lower surface 16a.

The drum 14 also comprises at least one radial hole 18 having a side wall 18a. The hole 18 gives onto the outer cylindrical surface 14a of the drum 14. More specifically, a piston 19 is slidably mounted to move inside the hole 18 and has an upper surface 20. More specifically, the upper surface 20 comprises a cavity 21 having a respective inside surface 21a.

The piston 19 can move axially inside the hole 18 between a first, non-operating position, in which the distance between the upper surface 20 and the outer cylindrical surface 14a is at its maximum, and a second, operating position, in which the distance is at its minimum.

More specifically, the wall 18a of the hole 18 and the upper surface 20 of the piston 19 define the chamber 22.

The volume of the chamber 22 is variable between a maximum value at the first, non-operating position of the piston 19, in which the chamber 22 is further delimited by the lower surface 16a of the box-shaped body 16, and a minimum value at the second, operating position, in which the chamber 22 is substantially delimited, not by the lower surface 16a, but by the curved surface 25a of the fixed bent tile 25.

In the embodiment illustrated, the drum 14 has a plurality of chambers 22, uniformly distributed along the outer cylindrical surface 14a of the selfsame drum 14.

The transfer means 5 comprise a control unit 26 able to receive an angular positioning signal relating to the roller 15 and also being able to control the retaining and releasing means 8. More specifically, the control unit 26 controls the actuating means of the swinging walls 12 of the retaining and releasing means 8 in such a way as to move the walls 12 from the first, retaining position to the second, releasing position, and vice versa. In particular, this occurs in synchrony with the rollers 15.

The packaging machine 3 comprises conveyor means 27 for the charges 2, unwinding means 28 for the web 29 of filter material, located upstream of the conveyor means 27, and represented by a roll in the drawing, and packaging means 30 located downstream of the conveyor means 27. More in detail, the packaging means 30, schematically illustrated as a block in the drawing, are designed to fold, seal and cut the web 29 of filter material to make the filter bags.

More specifically, the conveyor means 27 are located downstream of the drum 14, at an outfeed station Z, and consist, in the embodiment illustrated, of a conveyor belt 31.

In an embodiment which is not illustrated, the conveyor means 27 may consist of a conveyor belt 31 furnished with suction holes and vacuum generating means to enhance adherence of the charge 2 to the web 29 of filter material.

In use, the metering means 4 measure out the charge 2 according to the preset quantity of infusion material and direct it towards the transfer means 5.

At the infeed end of the transfer means 5, the charge 2 is released into the infeed station 6 when the swinging walls 12 of the retaining and releasing means 8 are in the first, retaining position.

By effect of a control signal sent by the control unit 26 to the actuating means (not illustrated) the swinging walls 12 then move to the second, releasing position, thereby releasing the charge 2 into the conduit 9 through the first, inlet section 10.

The unit 26 receives a signal indicating the angular position of the roller 15 and when the recess 17 containing the preceding charge 2 has left the zone delimited by the first funnel-shaped mouth 23, it sends a control signal to the actuating means of the swinging walls 12, causing the latter to move to the second, releasing position, so as to release the charge 2.

At the outlet section 11 of the conduit 9, the charge 2 passes through the first funnel-shaped mouth 23 of the box-shaped body 16 and settles in the recess 17 of the roller 15.

The roller 15, turning clockwise, takes the recess 17—and thus the charge 2—to a position facing the second funnel-shaped mouth 24 of the box-shaped body 16; and at the same time, the drum 14, turning in the opposite direction to, and in synchrony with, the roller 15, takes the chamber 22 to a position where it also faces the second funnel-shaped mouth 24 so that the charge 2 is transferred from the recess 17 to the chamber 22.

When it faces the second, funnel-shaped mouth 24, the chamber 22, is at its maximum volume so it can better receive the charge 2 without deteriorating the infusion material, since the piston 19 is at the first, non-operating position.

The piston 19 remains in the non-operating position until the charge 2 is completely transferred.

Once the charge 2 has been transferred into the chamber 22 and before it reaches the outfeed station Z, the piston 19 reaches the second, operating position and the charge 2 is adjusted as the volume of the chamber 22 is reduced. More specifically, the latter is partly defined by the curved surface 25a of the fixed bent tile 25.

During its transfer from the retaining and releasing means 8 to the chamber 22, the charge 2 always moves through spaces whose volumes are larger than the volume occupied by the charge 2 itself. Thus, the charge 2 does not encounter any physical obstacle that can damage it in any way.

During reduction of the volume of the chamber 22, the elements making up the charge 2 come in contact with the curved surface 25a of the fixed bent tile 25 and are thus distributed in a substantially uniform manner within the chamber 22 while occupying the minimum volume. That way, the piston 19 and the fixed bent tile 25 act in conjunction to adjust the charge 2.

That also means the charge 2 undergoes adjustment which allows the product to remain whole before it reaches the outfeed station Z.

Once adjusted, the charge 2 is brought into contact with the web 29 of filter material in the proximity of the outfeed station Z. In the outfeed station Z, the web 29 of filter material remains substantially in contact with the drum 14 along a stretch between the end of the fixed bent tile 25 and a point of substantial tangency with the conveyor belt 31. Further, in the outfeed station Z, the adjusted charge 2 is released onto the web 29 of filter material, thereby clearing the chamber 22. Lastly, the charge 2 and the web 29 of filter material are directed towards the packaging means 30 of the packaging machine 3 on the conveyor belt 31.

The invention described above achieves the above mentioned aims and brings important advantages. The device for feeding the charges 2, as described and illustrated, minimizes deterioration of the elements making up the charge of non-homogeneous material because, during transfer from the infeed station 6 to the adjustment means 7, the charge always moves through spaces whose volumes are larger than the volume occupied by the charge itself. Moreover, during adjustment, the elements making up the charges are distributed in a substantially uniform manner within the chambers 22 in the drum 14, occupying the minimum volume of the chambers themselves.

Another advantage of this feed device is that it produces charges 2 which are perfectly and neatly arranged and adapted to allow the filter material to be properly sealed around each charge. In effect, in a charge that is not neatly arranged and adapted, some of the elements making up the charge might settle on the parts of the filter material to be joined to each other, thus preventing the filter bags from being properly sealed.

A further advantage of the feed device described above is that it appreciably reduces the time taken by the charges 2 to be taken from the point where they are formed to that where they are packaged, since the two rollers 15 act in conjunction and in synchrony with the drum 14 and guarantee the coordinated transfer of the charges from the recesses 7 of the rollers to the chambers 22 of the drum 14. Reducing the transfer time of the charges 2 in turn allows the packaging machine to reach high production speeds.

The invention claimed is:

1. A device for feeding charges (2) of a non-homogeneous infusion material to a packaging machine (3) comprising:
    a metering device for the charges of the non-homogeneous infusion material; and
    a transfer system (5) for the charges (2) which is positioned downstream of the metering device (4) and which feeds the charges (2) to the packaging machine (3), the transfer system (5) comprising an adjustment system (7) for the charges (2), wherein the adjustment system (7) for the charges (2) comprises a drum (14) which is rotatable about an axis (A) thereof,
    wherein the drum (14) comprises at least one hole (18) in which a piston (19) having an upper surface (20) with a cavity thereon is slidably movable, the cavity being dimensioned to receive the charge in its entirety, the hole (18) and the cavity in the upper surface (20) of the piston (19) defining a chamber (22) whose volume is variable between a maximum value when the piston (19) is at a first, non-operating position for receiving the charges, and a minimum value when the piston (19) is at a second, operating position for delivering the charges,
    wherein the transfer system (5) comprises an infeed station (6) for feeding the charges to the transfer system (5),
    wherein the adjustment system (7) is positioned downstream of the infeed station (6), and
    wherein, during transfer from the infeed station (6) to the adjustment system (7), the charges always move through spaces whose volumes are larger than the volumes occupied by the charges themselves.

2. The device according to claim 1, wherein the infeed station (6) comprises a retaining and releasing system (8) retaining a charge when the retaining and releasing system is closed, and releasing the charge (2) when the retaining and releasing system is open.

3. The device according to claim 2, wherein the adjustment system (7) comprises at least one roller (15) positioned upstream of the drum (14), and configured to rotate about an axis (B) thereof.

4. The device according to claim 3, wherein the at least one roller (15) has at least one recess (17) for receiving the charge (2) from the infeed station (6).

5. The device according to claim 4, wherein the at least one hole (18) in the drum is radial.

6. The device according to claim 5, wherein in the first, non-operating position, a distance between the upper surface (20) of the piston and an outer cylindrical surface (14a) of the drum (14) is maximum, and in the second, operating position, the distance is minimum.

7. The device according to claim 6, wherein the adjustment system (7) comprises a fixed bent tile (25) positioned laterally of the hole (18) and, according to a direction of rotation of the drum (14), downstream of a second funnel-shaped mouth (24) connecting the at least one recess (17) with the chamber (22).

8. The device according to claim 7, wherein a volume of the chamber (22) is variable between a maximum value at the first, non-operating position of the piston (19), in which the chamber (22) is further delimited by a lower surface (16a) of a box-shaped body (16), and a minimum value at the second, operating position, in which the chamber (22) is substantially delimited, not by the lower surface (16a), but by a curved surface (25a) of the fixed bent tile (25).

9. The device according to claim 3, wherein the transfer system (5) comprises a control unit (26) configured to receive an angular positioning signal relating to said at least one roller (15) and further configured to control the retaining and releasing system (8).

10. A method for feeding charges (2) of non-homogeneous infusion material to a packaging machine (3) comprising the steps of:
producing a charge (2) of the non-homogeneous infusion material using a metering device (4);
inserting the charge (2) into an infeed station (6) leading from the metering device (4) to an adjustment system (7);
transferring the charge (2) from the metering device (4) to the packaging machine (3); and
adjusting the charge (2), using the adjustment system (7), during the step of transferring the charge (2) to the packaging machine (3),
wherein the step of adjusting the charge (2) comprises receiving each charge (2) in a respective chamber (22) whose volume is variable between a maximum value coinciding with the receiving step and a minimum value coinciding with the step of adjusting the charge (2),
wherein the chamber is defined in an opening in a drum having a piston translatable therein, the chamber being having a lower surface shaped as a cavity in an upper surface of the piston, the cavity being dimensioned to receive the charge in its entirety, and
wherein, during transfer from the infeed station (6) to the adjustment system (7), the charge always moves through spaces whose volumes are larger than the volume occupied by the charge itself.

11. The method according to claim 10, further comprising the step of providing a fixed bent tile (25) positioned laterally of the opening (18) and, according to a direction of rotation of the drum (14), downstream of the infeed station (6).

* * * * *